United States Patent [19]

Kawamura

[11] Patent Number: 5,168,706
[45] Date of Patent: Dec. 8, 1992

[54] THERMALLY INSULATED TURBOCHARGED ENGINE

[75] Inventor: Hideo Kawamura, Samukawa, Japan

[73] Assignee: Isuzu Ceramics Research Institute Co., Ltd., Fujisawa, Japan

[21] Appl. No.: 499,420

[22] PCT Filed: Oct. 20, 1989

[86] PCT No.: PCT/JP89/01079
§ 371 Date: Jun. 20, 1990
§ 102(e) Date: Jun. 20, 1990

[87] PCT Pub. No.: WO90/04708
PCT Pub. Date: May 3, 1990

[30] Foreign Application Priority Data

Oct. 20, 1988 [JP] Japan ................. 63-264830

[51] Int. Cl.$^5$ ................. F02B 37/00; F02M 33/00
[52] U.S. Cl. ................. 60/608; 60/599; 123/585
[58] Field of Search ................. 60/599, 605.1, 607, 60/608; 123/559.1, 563, 567, 585; 55/61, 158

[56] References Cited

U.S. PATENT DOCUMENTS 3,143,103  8/1964  Zuhn ................. 60/599
4,833,887  5/1989  Kawamura et al. ................. 60/608

FOREIGN PATENT DOCUMENTS 71222   6/1979  Japan .
50253   5/1981  Japan .
155218  9/1983  Japan ................. 123/585
158317  9/1983  Japan .
142461  9/1984  Japan .
48932   3/1987  Japan .
157271  7/1987  Japan .
18177   1/1988  Japan ................. 123/559.1
37161   2/1990  Japan ................. 123/585

Primary Examiner—Michael Koczo
Attorney, Agent, or Firm—Staas & Halsey

[57] ABSTRACT

A thermally insulated engine (1) includes a combustion chamber which has principal portions made of a thermally insulating material and a turbocharger (2) which has a compressor coupled to a turbine (21) for supercharging the engine (1). The thermally insulated engine comprises an electric motor (3) mounted on a rotatable shaft (22) of the turbine, a detecting unit (13, 14) for detecting an operating condition of the engine, an oxygenating mechanism (6) having an oxygenating film, a compressor mounted on the rotatable shaft (22) of the turbine for delivering oxygenated air from the oxygenating mechanism (6) to the engine, and a control unit (5) for controlling the electric motor to assist in operating the compressor and controlling the amount of oxygenated air depending on the operating condition of the engine as detected by the detecting unit. When the engine is accelerated, for example, the concentration of oxygen in the intake air is increased for suppressing NOx and soot in exhaust gases.

7 Claims, 2 Drawing Sheets

THERMALLY INSULATED TURBOCHARGED ENGINE

BACKGROUND OF THE INVENTION

The present invention relates to a thermally insulated engine including a combustion chamber, principal portions of which are made of a thermally insulating material.

There has been developed a thermally insulated engine including heated portions around a combustion chamber, such as a cylinder liner, a cylinder head, a piston head, piston rings, valves, and intake and exhaust ports, which are made of a ceramic material as a thermally insulating material.

With such a thermally insulated engine, the cylinder liner and the cylinder head are not required to be cooled, and hence a radiator system therefor is not necessary. Since the engine itself is structurally simple, it is much lighter and smaller in volume than conventional engines.

However, inasmuch as the cylinder liner and the cylinder head are not cooled, the inner wall surface of the combustion chamber is kept at a high temperature when the thermally insulated engine is subjected to a full load. Stated otherwise, when the engine is operated for acceleration, the air which is adiabatically compressed is heated to a high temperature and kept under a high pressure at the end of the compression stroke. Therefore, more nitrogen oxides (NOx) tend to be produced when the fuel is burned than they are in the combustion chamber of an engine which has an ordinary radiator.

In order to suppress the generation of nitrogen oxides, the fuel may be supplied at an increased rate for an increased air-fuel ratio. If the air-fuel mixture becomes rich, however, soot (black smoke) is produced.

SUMMARY OF THE INVENTION

In view of the aforesaid problems, it is an object of the present invention to provide a thermally insulated engine which can easily reduce NOx and soot in exhaust gases.

According to the present invention, there is provided a thermally insulated engine including a combustion chamber which has principal portions made of a thermally insulating material and a turbocharger which has a compressor coupled to a turbine drivable by the exhaust energy of the engine, for supercharging the engine, the thermally insulated engine comprising detecting means for detecting an operating condition of the engine, an electric motor mounted on a rotatable shaft of the turbine, an oxygenating mechanism having an oxygenating film, a compressor mounted on the rotatable shaft of the turbine for delivering oxygenated air from the oxygenating mechanism to the engine, and control means for controlling the electric motor to assist in operating the compressor and controlling the amount of oxygenated air depending on the operating condition of the engine as detected by the detecting means.

Only oxygen in air passes through the oxygenating mechanism, and oxygenated air is supplied to the engine. The amount of air is controlled by the motor which is driven depending on the operating condition of the engine. A second compressor serving as a source of air to be supplied to the oxygenating mechanism is disposed coaxially with the compressor, and a cooling unit is provided which cools intake air to be supplied to the engine when the second compressor operates. When the engine is accelerated, the concentration of oxygen in the intake air is increased, and the temperature of the intake air is lowered. The temperature and pressure of the intake air at the end of the compression stroke of the supercharged thermally insulated engine are lowered to the same degree as that of ordinary engines. Even when a lot of fuel is burned, the generation of NOx and soot is suppressed since the concentration of oxygen in the intake air is high.

DESCRIPTION OF THE PREFERRED EMBODIMENT

An embodiment of the present invention will hereinafter be described with reference to the drawings.

Figure 1:
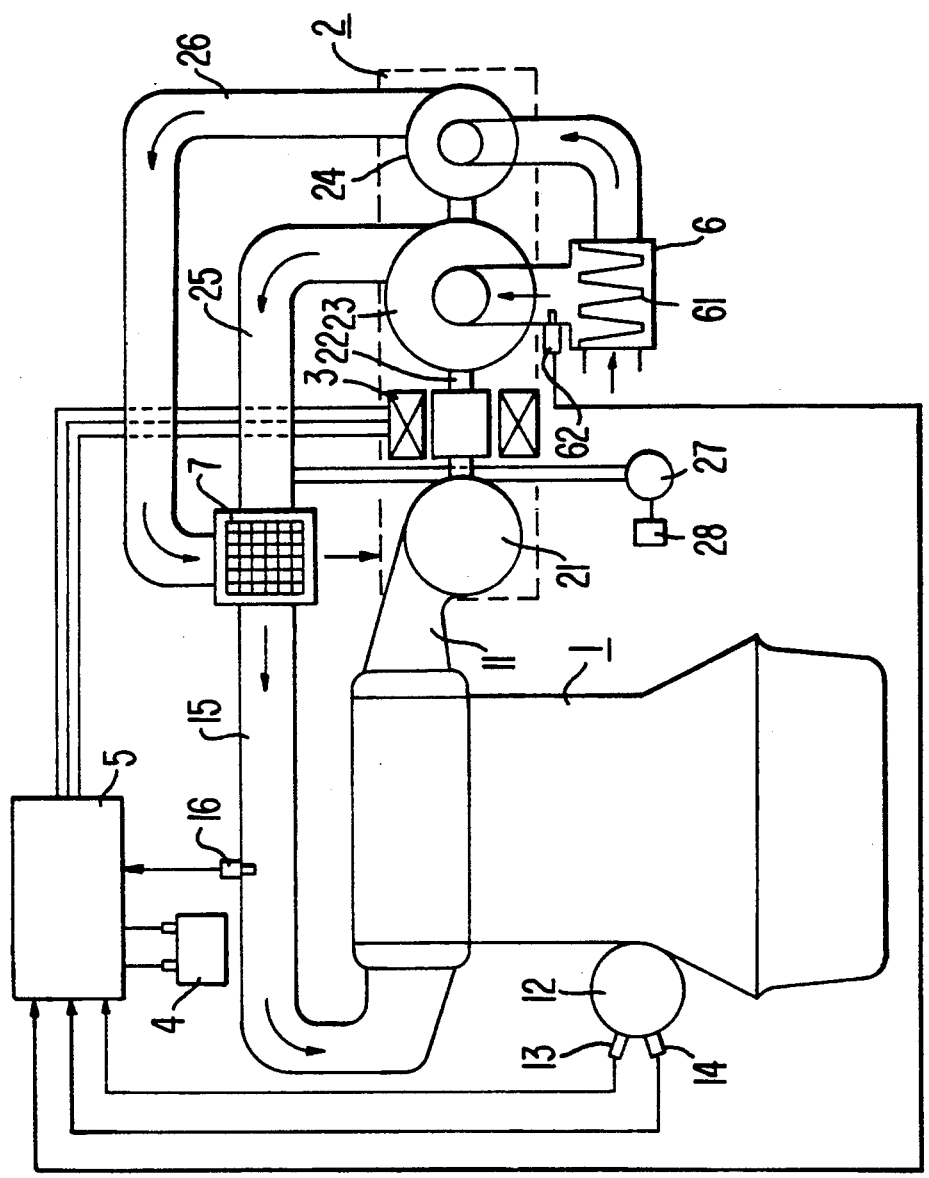
FIG. 1 is a block diagram showing a thermally insulated engine according to an embodiment of the present invention.

As shown in FIG. 1, a thermally insulated engine 1 comprises a diesel engine including combustion chamber members, such as a cylinder liner, a cylinder head, a piston head, piston rings, valves, and intake and exhaust ports, which are made of a refractory thermally insulating material of ceramic. The engine 1 has a fuel injection pump 12 as a fuel supply mechanism and is associated with a rotation sensor 13 for detecting the rotational speed of the engine and a load sensor 14 for detecting the engine load from the rate of fuel supplied. Detected signals from these sensors 13, 14 are sent to a controller (described later).

A turbocharger 2 comprises a turbine 21 and first and second compressors 23, 24 mounted on a rotatable shaft 22 of the turbine 21. The turbine 21 is connected to an exhaust pipe 11 of the engine 1 so that the turbine 21 can be rotated by the energy of exhaust gases discharged from the exhaust pipe 11. An electric induction motor 3 is disposed on the rotatable shaft 22 of the turbine 21 coaxially with the compressors 23, 24.

The induction motor 3 along with a battery 4 as an electric power source therefor is supplied with AC electric energy converted into a predetermined frequency from a controller 5. When the engine 1 is under a transient condition such as acceleration, the induction motor 3 is instructed by the controller 5 to be driven by the AC electric energy supplied to the induction motor 3, thereby increasing the speed of rotation of the first and second compressors 23, 24.

The first compressor 23 comprises a centrifugal compressor having large impeller, with a large compression ratio. An oxygenating mechanism 6 is disposed upstream of the compressor 23, and a cooling unit 7 is disposed down-stream of the compressor 23 with a conduit 25 interposed therebetween. Air which is oxygenated by the oxygenating mechanism 6 is supplied from the cooling unit 7 through an intake pipe 15 to the engine 1.

The second compressor 24 comprises a large-capacity, low-compression-type centrifugal compressor. The second compressor 24 is used as a source for supplying air to the cooling unit 7. Air, from which oxygen is partly removed by the oxygenating mechanism 6, is delivered through a conduit 26 to the cooling unit 7 for lowering the temperature of the oxygenated air to be supplied to the engine.

The controller 5 comprises a microcomputer, and has a central processing unit for effecting necessary arithmetic operations to control the motor 3 to assist in operating the first and second compressors 23, 24 to control the amount of oxygenated air, various memories for storing a control program representing a procedure for the arithmetic operations and arithmetic processes, an input/output port, and a power inverter for converting DC electric energy into AC electric energy having a predetermined frequency.

A pressure sensor 16 is disposed in the intake pipe 15 of the engine 1 for measuring the pressure of oxygenated intake air. An air regulating valve 27 for regulating an air flow toward the engine 1 is connected to the conduit 25 which extends between the first compressor 23 and the cooling unit 7. The air regulating valve 27 is controlled by an air pressure control unit 28. An oxygen amount detector 62 is disposed on the output side of the oxygenating mechanism 6 for detecting the rate of oxygen from the oxygenating mechanism 6.

Figure 2:
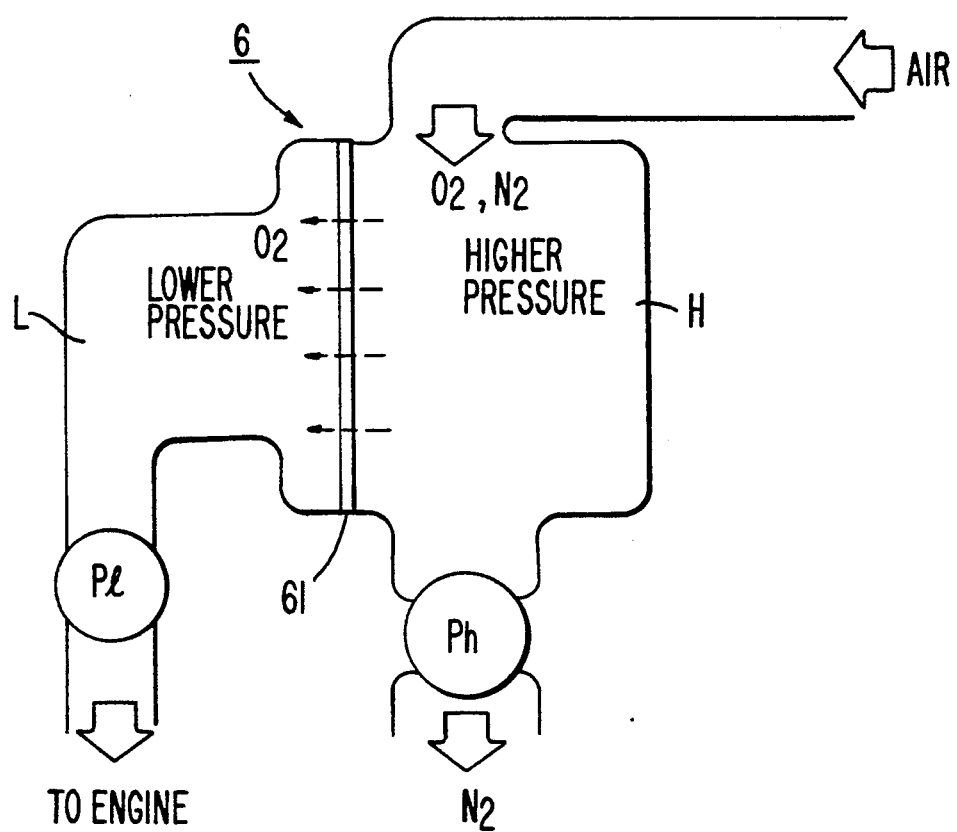
FIG. 2 is a schematic view showing an oxygenating mechanism used in the thermally insulated engine according to the embodiment.

FIG. 2 schematically shows the oxygenating mechanism 6.

The oxygenating mechanism 6 includes a thin film 61 of a high polymer such as a copolymer of dimethyl siloxane and polycarbonate, the thin film 61 being about 0.1 $\mu$m thick. The oxygenating mechanism 6 defines an air chamber H and an enriched oxygen chamber chamber L which are separated from each other by the high-polymer thin film 61 therebetween. Air is sucked under pressure into the air chamber H by the second compressor 24 (air supply pipe Ph). Only oxygen molecules contained in the air in the air chamber H pass through the high-polymer thin film 61 into the enriched oxygen chamber L, and hence are separated from nitrogen molecules. The oxygen molecules are drawn under vacuum from the enriched oxygen chamber L by the first compressor 23 (air supply pump Pl), which therefore delivers air with a higher oxygen content to the engine 1.

Operation of the thermally insulated engine thus constructed will be described below.

When the engine 1 is operated, the energy of exhaust gases discharged from the exhaust pipe 11 rotates the turbine 21 of the turbocharger 2. The first and second compressors 23, 24 mounted on the rotatable shaft 22 of the turbine 21 are driven, and air is supplied to the oxygenating mechanism 6 by the second compressor 24. Therefore, air which is oxygenated by oxygen that has passed through the high-polymer thin film 61 is fed by the first compressor 23 through the conduit 25 and the cooling unit 7 to the intake pipe 15 of the engine 1. At this time, the oxygenated air as it passes through the cooling unit 7 is sufficiently cooled by air with a higher nitrogen content discharged from the second compressor 24, so that the oxygenated air is supplied at a sufficiently low temperature to the engine 1.

When the engine 1 is accelerated, signals depending on the accelerated condition are applied from the rotation sensor 13 and the load sensor 14 which are associated with the injection pump 12 to the controller 5. Based on these supplied signals, the controller 5 converts DC electric energy from the battery 4 into AC electric energy having a predetermined frequency and supplies the AC electric energy to the motor 3. When the motor 3 is thus energized, the rotational speeds of the first and second compressors 23, 24 are increased, promoting the oxygenating action of the oxygenating mechanism 6. Therefore, the amount of oxygen-rich air which is necessary for accelerating the engine 1 is supplied to the engine 1. Since the oxygenated air is cooled by the cooling unit 7, the generation of NOx and soot is suppressed.

The condition in which the intake air is oxygenated by the oxygenating mechanism 6 is determined by detected signals from the oxygen amount detector 62 and the pressure sensor 16 in the intake pipe 15, so that the transient condition as during acceleration is accurately grasped. Consequently, this is condition in which the two compressors 23, 24 can optimally be controlled.

Although a certain preferred embodiment has been shown and described, it should be understood that many changes and modifications may be made therein without departing from the scope of the appended claims.

The present invention is suitable for use as a thermally insulated engine which includes a combustion chamber made of a thermally insulating material and has a turbocharger that has a compressor coupled to a turbine driven by the energy of exhaust gases emitted from the engine, for supercharging the engine.

I claim:

1. A thermally insulated engine including a combustion chamber which has portions made of a thermally insulating material and a turbocharger which has a compressor coupled to a turbine drivable by the exhaust energy of the engine, for supercharging the engine, said thermally insulated engine comprising:

detecting means for detecting an operation condition of the engine;

an electric motor mounted on a rotatable shaft of the turbine;

an oxygenating mechanism having an oxygenating film;

a first compressor mounted on said rotatable shaft of the turbine for delivering oxygenated air from said oxygenating mechanism to the engine;

control means for controlling said electric motor to assist in operating the compressor and controlling the amount of oxygenated air depending on the operating condition of the engine as detected by said detecting means;

a cooling unit disposed downstream of said first compressor for lowering the temperature of oxygenated intake air to be supplied to the engine; and a second compressor mounted on said rotatable shaft of the turbine, separately from said first compressor, for supplying air to said oxygenating mechanism, said second compressor delivering air, with oxygen partly removed therefrom, to said cooling unit to lower the temperature of the oxygenated intake air to be supplied to the engine.

2. A thermally insulated engine according to claim 1, wherein said detecting means comprises:

a rotation sensor for detecting the rotational speed of the engine; and a load sensor for detecting the rate of fuel supplied to the engine.

3. A thermally insulated engine according to claim 1, wherein said electric motor comprises an induction motor with a battery as an electric power source therefor, said electric motor being supplied with AC electric energy having a predetermined frequency converted by said control means.

4. A thermally insulated engine according to claim 1, wherein said oxygenating mechanism has a high pressure chamber and a low pressure chamber which are separated from each other by a high-polymer thin film which allows only oxygen to pass therethrough.

5. A thermally insulated engine according to claim 4, wherein said high-polymer thin film compressor a copolymer of dimethyl siloxane and polycarbonate, and has a thickness of approximately 0.1 μm.

6. A thermally insulated engine according to claim 1, further comprising a pressure sensor, operatively connected to said control means, disposed in an intake pipe of the engine.

7. A thermally insulated engine according to claim 1, further comprising an oxygen amount detector disposed on the output side of said oxygenating mechanism.

* * * * *

UNITED STATES PATENT AND TRADEMARK OFFICE
CERTIFICATE OF CORRECTION

PATENT NO. : 5,168,706
DATED : DECEMBER 8, 1992
INVENTOR(S) : Hideo KAWAMURA It is certified that error appears in the above-identified patent and that said Letters Patent is hereby corrected as shown below:

Col. 3, line 40, "Pl)," should be --P$\ell$),--.

Col. 4, line 13, "is condition" should be --is the condition--.

Col. 5, line 10, "compressor" should be --comprises--.

Signed and Sealed this

Seventh Day of December, 1993

Attest:

BRUCE LEHMAN

Attesting Officer     Commissioner of Patents and Trademarks